United States Patent
Ho et al.

(10) Patent No.: US 11,775,063 B1
(45) Date of Patent: Oct. 3, 2023

(54) DISPLAY DEVICE AND DISPLAY METHOD

(71) Applicant: AmTRAN Technology Co., Ltd., New Taipei (TW)

(72) Inventors: Ming Che Ho, New Taipei (TW); Wen Lin Tsai, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/806,939

(22) Filed: Jun. 14, 2022

(30) Foreign Application Priority Data

Mar. 14, 2022 (TW) .................................. 111109287

(51) Int. Cl.
| | |
|---|---|
| *G06F 3/01* | (2006.01) |
| *G06T 7/73* | (2017.01) |
| *G06V 40/16* | (2022.01) |
| *G06T 7/50* | (2017.01) |
| *G06F 3/14* | (2006.01) |
| *G06V 40/18* | (2022.01) |

(52) U.S. Cl.
CPC .............. *G06F 3/013* (2013.01); *G06F 3/012* (2013.01); *G06F 3/14* (2013.01); *G06T 7/50* (2017.01); *G06T 7/73* (2017.01); *G06V 40/16* (2022.01); *G06V 40/18* (2022.01); *G06T 2207/30201* (2013.01)

(58) Field of Classification Search
CPC . G06F 3/013; G06F 3/012; G06F 3/14; G06T 7/50; G06T 7/73; G06T 2207/30201; G06V 40/16; G06V 40/18
See application file for complete search history.

(56) References Cited

U.S. PATENT DOCUMENTS

| | | | |
|---|---|---|---|
| 2019/0361658 A1* | 11/2019 | Shi .......................... | G06F 3/013 |
| 2021/0142765 A1 | 5/2021 | Malhotra et al. | |
| 2022/0121277 A1* | 4/2022 | Azam .................. | G06F 3/04847 |
| 2022/0261069 A1* | 8/2022 | Candelore .......... | H04N 21/4223 |

FOREIGN PATENT DOCUMENTS

| | | |
|---|---|---|
| CN | 102955664 A | 3/2013 |
| CN | 107179824 A | 9/2017 |
| TW | 201520673 A | 6/2015 |

\* cited by examiner

*Primary Examiner* — Premal R Patel
(74) *Attorney, Agent, or Firm* — CKC & Partners Co., LLC (57) ABSTRACT

A display device including a display panel, an image capture element, and a processor is disclosed. The display panel displays a display screen, and to display an on screen display on the display screen. The image capture element captures an image. The processor analyzes the image to obtain an operator location information of an operator of the image and performs a face recognition operation corresponding to the operator, performs an eye recognition operation corresponding to the operator to obtain an operator eye information of the operator, and determines a display position and a display size of the on screen display on the display screen according to the operator location information and the operator eye information. The display panel displays the on screen display on the display screen according to the display position and the display size.

18 Claims, 7 Drawing Sheets

| the proportion of the human face occupying the display screen | >40% | 30%~40% | 20%~30% | <20% |
|---|---|---|---|---|
| the scaling ratio of the on screen display | 50% | 75% | 100% | 125% |

DISPLAY DEVICE AND DISPLAY METHOD

RELATED APPLICATIONS

This application claims priority to Taiwan Application Serial Number 111109287, filed Mar. 14, 2022, which is herein incorporated by reference.

BACKGROUND

Field of Invention

The present application relates to a display device and a display method. More particularly, the present application relates to a display device and a display method for displaying the on screen display (OSD).

Description of Related Art

With the advancement of technology, the user interfaces of various devices also tend to be more user-friendly. For example, with the development of technology, the screen size of the desktop display devices is getting larger and larger. Because the size of desktop display device is larger than that of general human-machine interface display devices, the on screen display (OSD) that controls the functions of the display device is usually not displayed on the full screen. Usually, the on screen display is displayed with a scaling ratio only less than ⅙ or ⅛ of the screen size. Generally, the position of the on screen display will be fixed at the center or lower right corner of the display panel. However, users must turn their necks and eyeballs to focus on the on screen display in order to perform subsequent operations on the monitor, which is inconvenient in operation.

SUMMARY

The disclosure provides a display device including a display panel, an image capture element, and a processor. The display panel is configured to display a display screen, and to display an on screen display (OSD) on the display screen. The image capture element is configured to capture an image. The processor is coupled to the display panel and the image capture element. The processor is configured to analyze the image to obtain an operator location information of an operator of the image and to perform a face recognition operation corresponding to the operator, and to perform an eye recognition operation corresponding to the operator to obtain an operator eye information of the operator, and to determine a display position and a display size of the on screen display on the display screen according to the operator location information and the operator eye information. The display panel displays the on screen display on the display screen according to the display position and the display size.

The disclosure provides a display method including the following operations: capturing an image by an image capture element; analyzing the image to obtain an operator location information of an operator in the image and performing a face recognition operation corresponding to the operator by a processor; performing an eye recognition operation corresponding to the operator to obtain an operator eye information of the operator by the processor; determining a display position and a display size of an on screen display on a display screen according to the operator location information and the operator eye information by the processor; and displaying the on screen display according to the display position and the display size on the display screen by a display panel.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

The term "coupled to" as used herein may also refer to "electrically coupled to", and the term "connected" may also refer to "electrically connected". "coupled to" and "connected" may also refer to two or more elements cooperating or interacting with each other.

Figure 1:
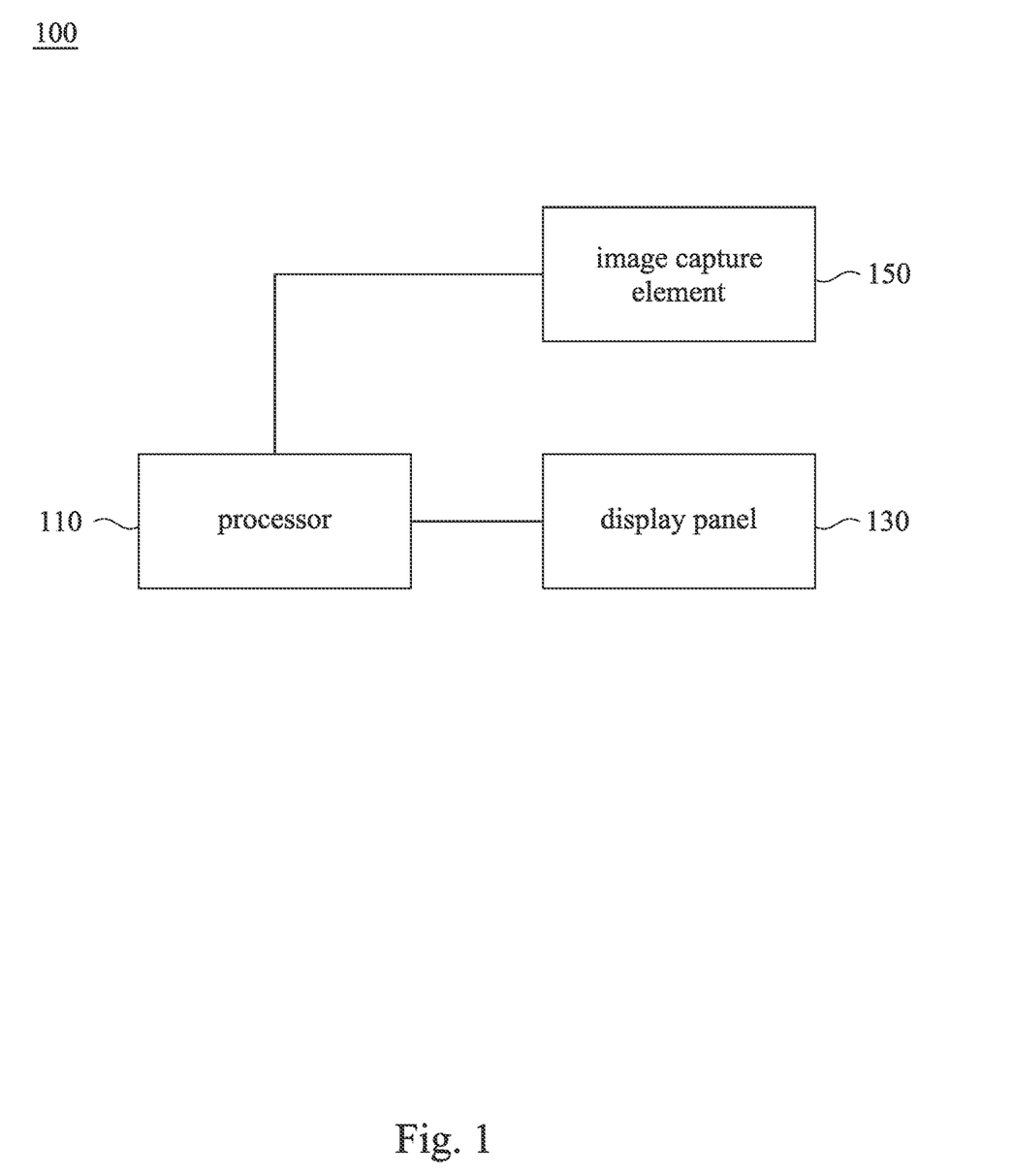
FIG. 1 is a schematic diagram illustrating a display device according to some embodiments of the present disclosure.

Reference is made to FIG. 1. FIG. 1 is a schematic diagram illustrating a display device 100 according to some embodiments of the present disclosure.

As illustrated in FIG. 1, the display device 100 includes the processor 110, the display panel 130 and the image capture element 150. In the connection relationship, the processor 110 is coupled to the display panel 130 and the image capture element 150. In some embodiments, the image capture element 150 is an element in the display device 100, in some other embodiments, the image capture element 150 is an element externally connected to the display device 100.

The configuration of the display device 100 mentioning above is for illustrative purposes only, and various configurations of the display device 100 are within the scope of the embodiments of the present disclosure. The detailed operation of the display device 100 will be described below in reference to the flowchart in FIG. 2.

Figure 2:
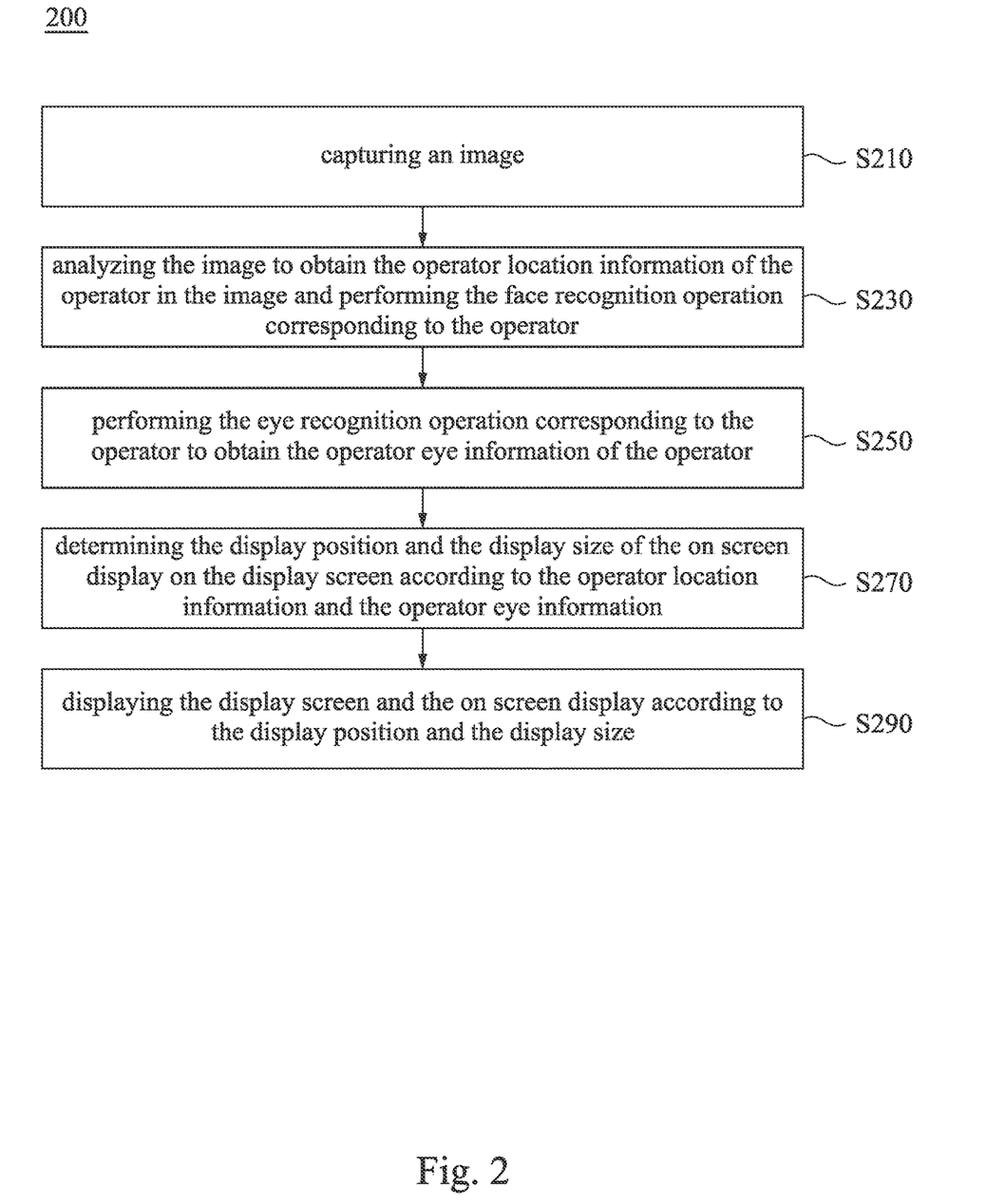
FIG. 2 is a flow chart diagram illustrating a display method according to some embodiments of the present disclosure.

Reference is made to FIG. 2. FIG. 2 is a flow chart diagram illustrating a display method 200 according to some embodiments of the present disclosure. The display method 200 can be applied to the display device 100 as shown in FIG. 1. Reference is made to FIG. 1 and FIG. 2 together below.

In operation S210, an image is captured. In some embodiments, operation S210 is performed by the image capture element 150 in FIG. 1. In some embodiments, the image capture element 150 is a video camera or a camera that captures the image of the environment in front of the display panel.

In operation S230, the image is analyzed to obtain the operator location information of the operator in the image and the face recognition operation corresponding to the operator is performed. In some embodiments, operation S230 is performed by the processor 110 in FIG. 1. In some embodiments, when performing the face recognition operation, the processor 110 obtains the facial features from the image, and then the processor 110 obtains the position information of the operator according to facial features. The facial features include the center of pupil, alar of nose, corner of mouth, etc. The position information of the operator includes the distance and direction of the operator relative to the display panel 130.

In operation S250, an eye recognition operation corresponding to the operator is performed to obtain the operator eye information of the operator. In some embodiments, the operation S250 is performed by the processor 110 in FIG. 1. In some embodiments, when performing the eye recognition operation, the processor 110 obtains the eye features from the image, and the processor 110 further obtains the operator eye information according to the eye features. The eye features includes features around the eye such as the head of the eye, the corner of the eye, the pupil, etc. The operator eye information includes the focus direction and the focus angle of the operator, and the focus point of the operator eye on the display screen.

In operation S270, the display position and the display size of the on screen display on the display screen is determined according to the operator location information and the operator eye information. In some embodiments, the operation S270 is performed by the processor 110 in FIG. 1. In some embodiments, the processor 110 determines the display size of the on screen display according to the distance of the operator relative to the display device in the operator location information. In some embodiments, the processor 110 determines the display position of the on screen display according to the direction of the operator relative to the display device, and the focus direction and the focus angle of the operator.

Figure 3:
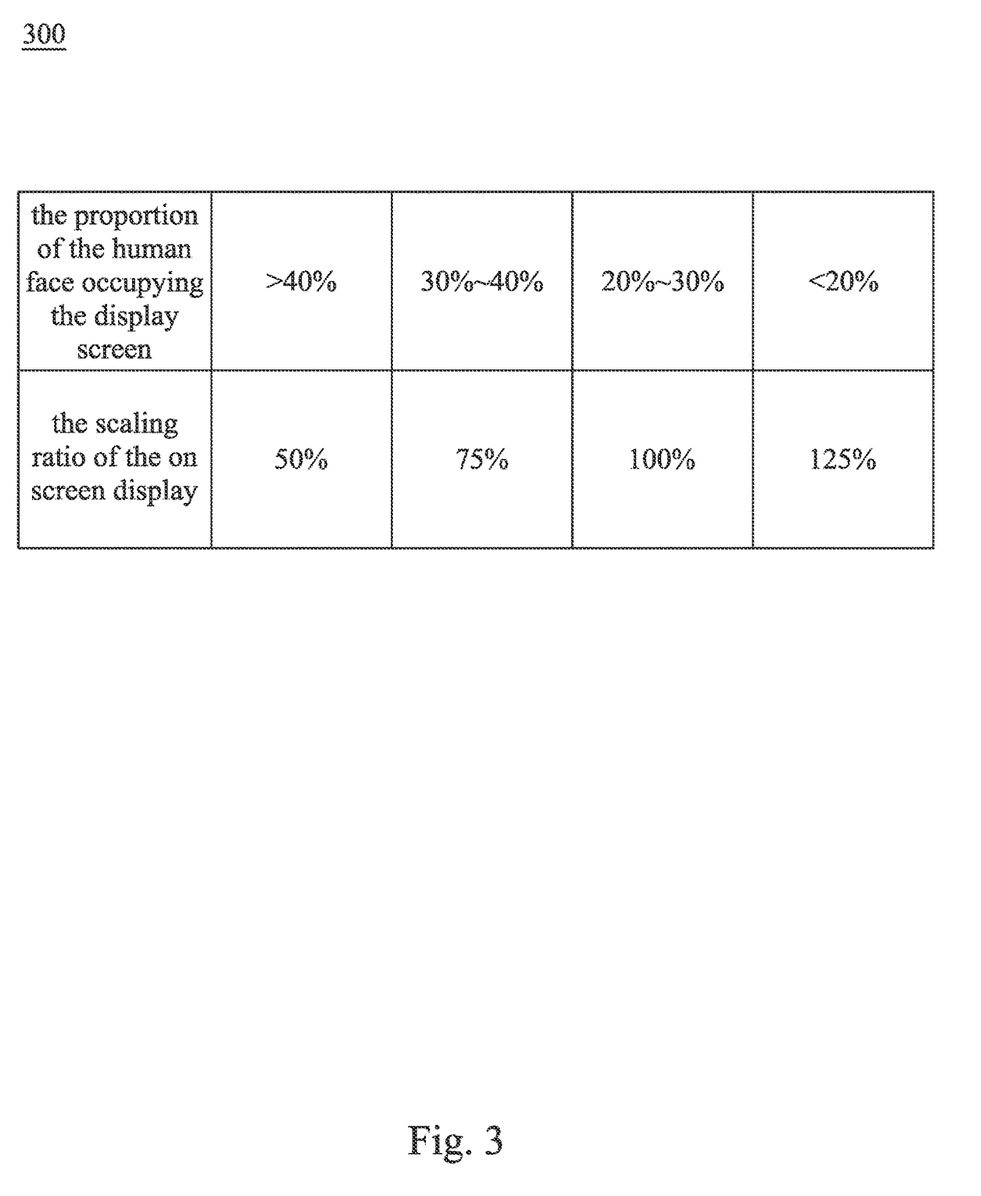
FIG. 3 is a schematic diagram illustrating an adjustment example of the display size according to some embodiments of the present disclosure.

In some embodiments, the processor 110 determines the distance of the operator relative to the display device according to the proportion of the face of the operator occupying the display screen, and the processor 110 determines the display size of the on screen display. In some other embodiments, the processor 110 directly determines the display size of the on screen display according to a proportion of the face of the operator occupying the display screen. For example, reference is made to FIG. 3. FIG. 3 is a schematic diagram illustrating an adjustment example 300 of the display size according to some embodiments of the present disclosure. Assuming that the on screen display has a preset display size. In some embodiments, the processor 110 adjusts the scaling ratio of the preset display size of the on screen display according to the proportion of the face of the operator occupying the display screen.

It may be seen from FIG. 3 that, when the proportion of the human face occupying the display screen is larger, it is indicated that the operator is closer to the display panel 130. The processor 110 reduces the display size of the on screen display. Conversely, when the proportion of the human face occupying the display screen is smaller, it is indicated that the operator is farther away from the display panel 130. The processor 110 enlarges the display size of the on screen display. In this way, the operator can have a better operating experience. In addition, as shown in FIG. 3, when the operator is far away from the display panel 130 (for example, when the human face occupies less than 20% of the proportion of the display screen, the display size of the on screen display will be enlarged to be larger than the preset display size of the on screen display.

Figure 4:
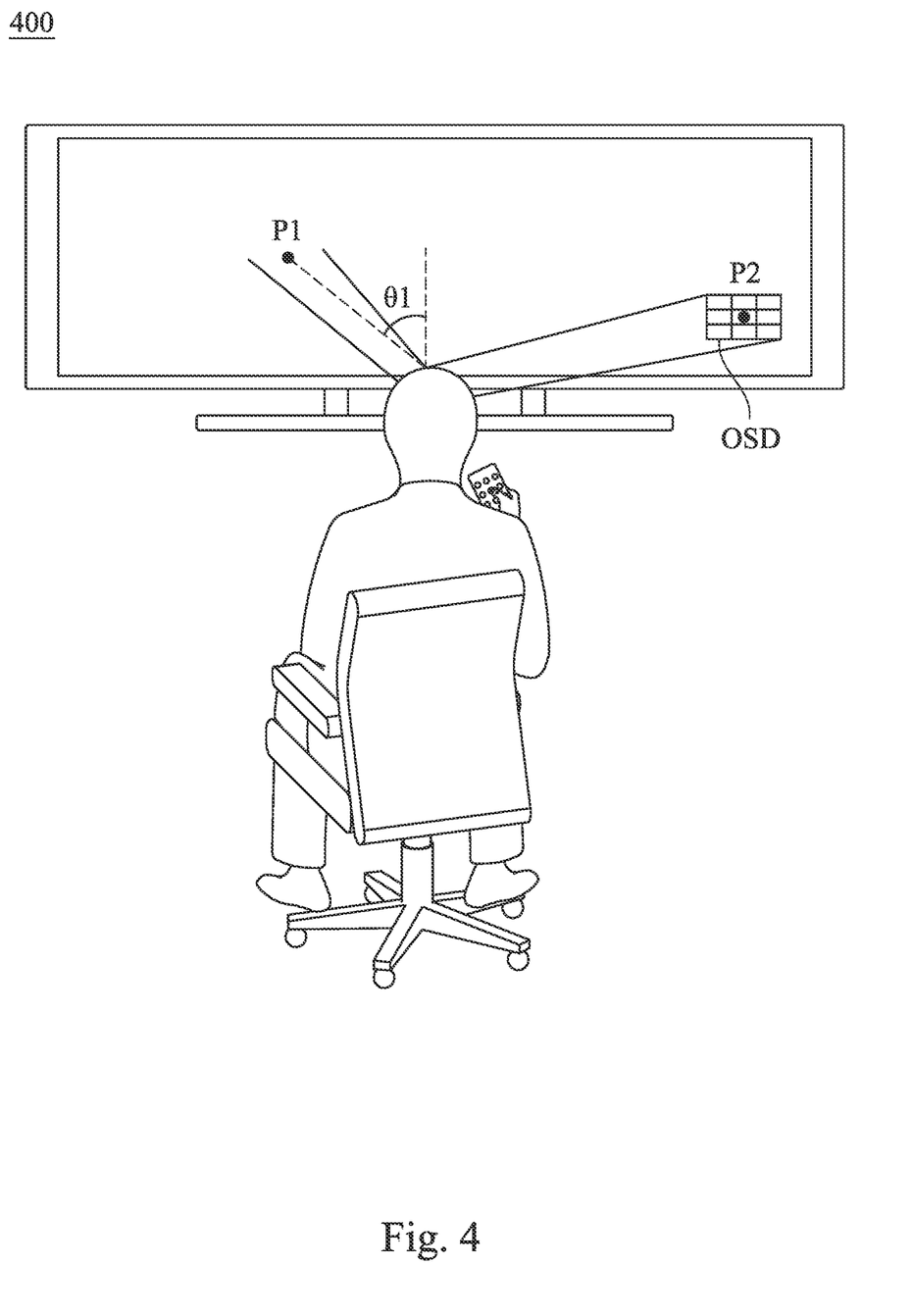
FIG. 4 is a schematic diagram illustrating an operating situation according to some embodiments of the present disclosure.
Figure 5:
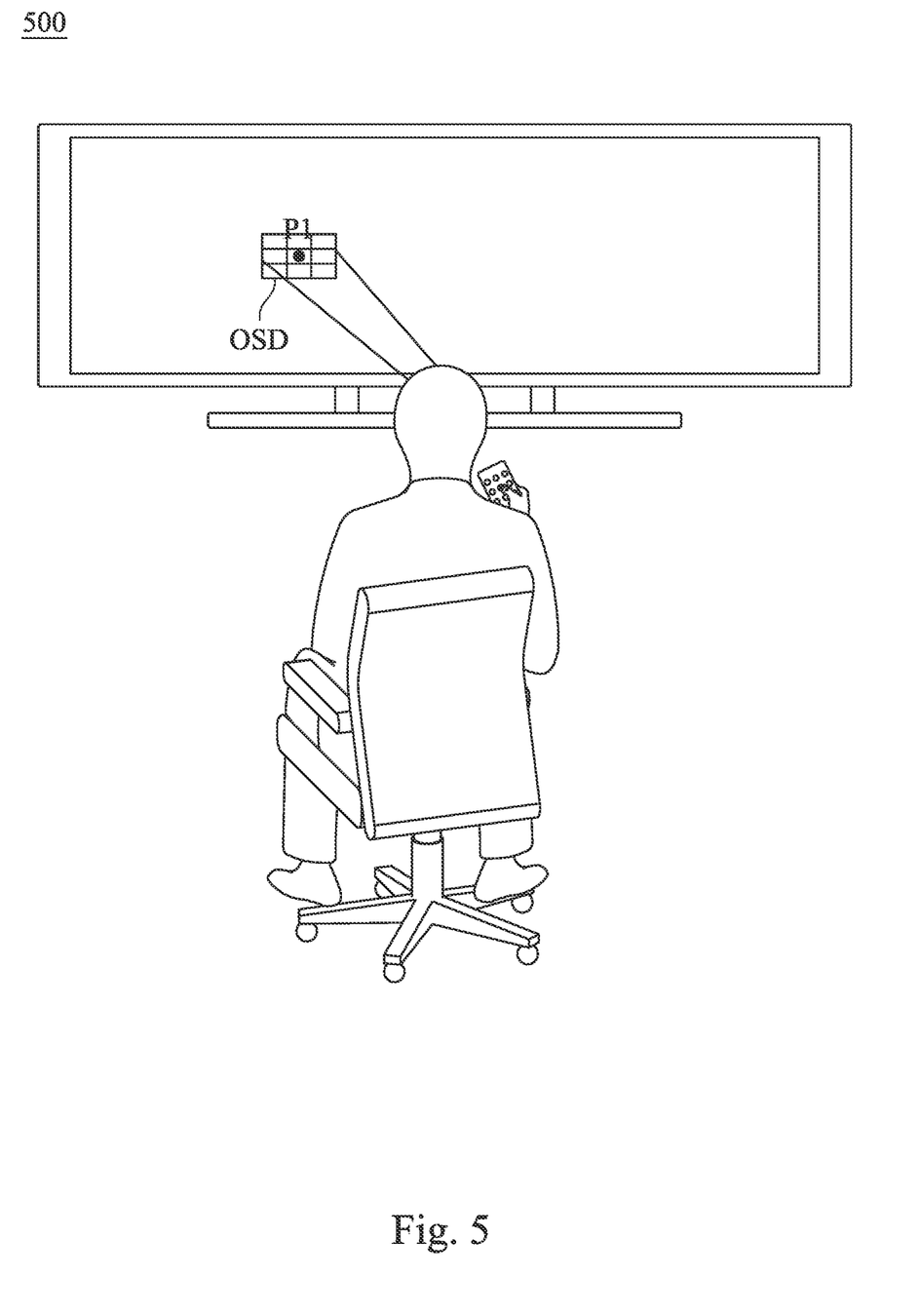
FIG. 5 is a schematic diagram illustrating an operating situation according to some embodiments of the present disclosure.

Reference is made to FIG. 4 and FIG. 5 again. FIG. 4 is a schematic diagram illustrating an operating situation 400 according to some embodiments of the present disclosure. FIG. 5 is a schematic diagram illustrating an operating situation 500 according to some embodiments of the present disclosure. In the situation of FIG. 4, the processor 110 obtains the direction of the operator relative to the display panel as the center of the display pane, the processor 110 obtains the focus direction of the operator is left, angle is θ1, and focus point is position P1. At this time, the processor 110 determines that the display position is position P1, and the processor 110 moves the on screen display OSD from position P2 to position P1. As illustrated in FIG. 5. In this way, the operator has a better operating experience.

Reference is made to FIG. 2 again. In operation S290, the display screen and the on screen display are displayed according to the display position and the display size. In some embodiments, the operation S290 is performed by the display panel 130 as illustrated in FIG. 1. The display panel 130 displays the display screen and the on screen display according to the display position and the display size determined in operation S270.

Figure 6:
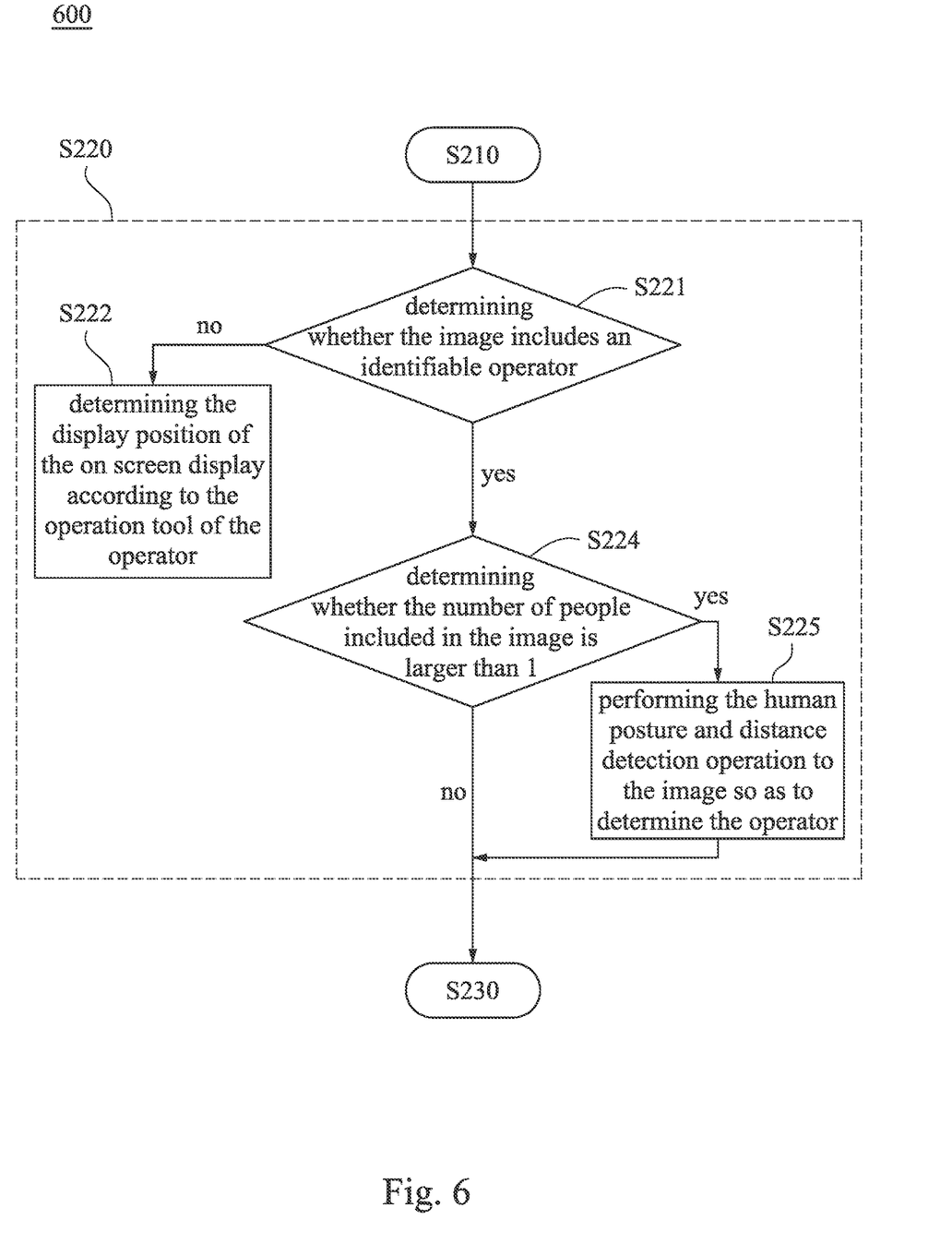
FIG. 6 is a flow chart diagram illustrating a display method according to some embodiments of the present disclosure.

Reference is made to FIG. 6. FIG. 6 is a flow chart diagram illustrating a display method 600 according to some embodiments of the present disclosure. As illustrated in FIG. 6, in some embodiments, between operation S210 and operation S230, operation S220 is further included. Operation S220 includes operation S221 to operation S225.

In operation S221, it is determined whether the image includes an identifiable operator. In some embodiments, operation S221 is performed by the processor 110 as illustrated in FIG. 1. If it is determined that the image does not include identifiable operators, operation S222 is performed. If it is determined that the image includes an identifiable operator, operation S224 is performed. For example, if the processor 110 determines that the image does not include a human face image according to the image, it is determined that the image does not include identifiable operators.

In operation S222, the display position of the on screen display is determined according to the operation tool of the operator. In some embodiments, operation S222 is performed by the processor 110 in FIG. 1. In some embodiments, when the operation tool is the remote controller operated from the remote, the display position is the center of the display screen. In some other embodiments, when the operation tool is the press-button located on the display panel 130, the display position is the position adjacent to the press-button on the display screen. For example, if the press-button is on the right side of the display panel 130, the display position is the right side of the display screen.

In operation S224, it is determined whether the number of people included in the image is larger than 1. In some embodiments, operation S224 is performed by the processor 110 in FIG. 1. If the number of people is larger than 1, operation S225 is performed. If the number of people is not larger than 1, operation S230 is performed.

In operation S225, the human posture and distance detection operation is performed to the image, so as to determine the operator. In some embodiments, operation S225 is performed by the processor 110 in FIG. 1. For example, in some embodiments, when the operation tool is the remote controller operated from remote, according to the result of the human posture and distance detection operation, the processor 110 determines that the posture of the human body being closest to the human who holds the remote controller and points to the display panel 130 is the operator. In some other embodiments, when the operation tool is the press-button of the display panel 130, according to the result of the human posture and distance detection operation, the processor 110 determines that the distance of the human body being closet to the display panel 130 and the human body posture being closest to the display panel 130 and operating the press-button to be the operator.

Figure 7:
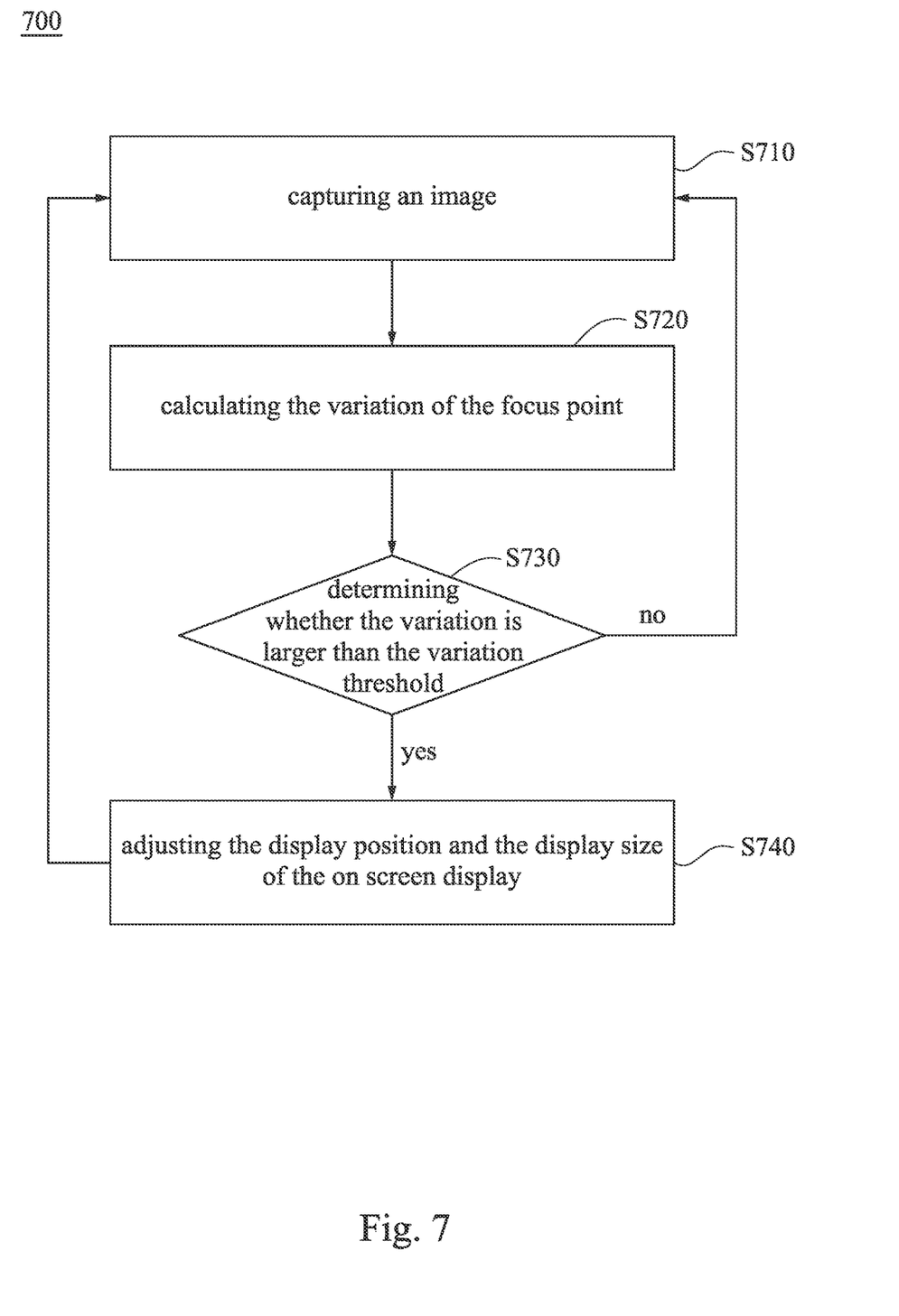
FIG. 7 is a flow chart diagram illustrating a display method according to some embodiments of the present disclosure.

Reference is made to FIG. 7. FIG. 7 is a flow chart diagram illustrating a display method 700 according to some embodiments of the present disclosure.

In operation S710, an image is captured. In some embodiments, operation S710 is performed by the image capture element 150 in FIG. 1.

In operation S720, the variation of the focus point is calculated. In some embodiments, operation S720 is performed by the processor 110 in FIG. 1. For example, assume that the image capture element 150 obtains the first image at time point T1, the processor 110 obtains the first focus point according to the first image. The image capture element 150 obtains the second image at time point T2, and the processor 110 obtains the second focus point according to the second image. The processor 110 calculates the variation of the second focus point relative to the first focus point. In some embodiments, the first focus point and the second focus point are represented by the coordinate position, when calculating the variation, the variation of the coordinate position between the first focus point and the second focus point is calculated.

In operation S730, whether the variation is larger than the variation threshold is determined. In some embodiments, operation S730 is performed by the processor 110 in FIG. 1. If the variation is larger than the variation threshold, operation S740 is performed. If the variation is not larger than the variation threshold, operation S710 is performed to continuously obtain images at different time points until the operator turns off the on screen display.

In operation S740, the display position and the display size of the on screen display are adjusted. In some embodiments, operation S740 is performed by the processor 110 in FIG. 1. The adjustment method of the display position and the display size of the on screen display is shown in FIG. 2, and will not be described in detail here.

The embodiments of the present disclosure provide a display device and a display method. When the operator is operating the on-screen display, the display device captures the image through the image capture element on the display device, and the display device calculates the distance, the direction, and the focus direction and focus angle of the eye of the operator relative to the display panel through the related algorithms of the face recognition operation and the eye recognition operation. Therefore, the on screen display can be displayed on the focus point of the operator's eye. When the operator operates the on screen display, there is no need to go back and forth between the focus point (that the user originally looking at the screen) and the fixed position of the on screen display, and there is no need to turn the neck and eyes back and forth. It is more intuitive for the operator to operate the on screen display.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a display panel, configured to display a display screen, and to display an on screen display (OSD) on the display screen;
   an image capture element, configured to capture an image; and
   a processor, coupled to the display panel and the image capture element, the processor is configured to analyze the image to obtain an operator location information of an operator of the image and to perform a face recognition operation corresponding to the operator, and to perform an eye recognition operation corresponding to the operator to obtain an operator eye information of the operator, and to determine a display position and a display size of the on screen display on the display screen according to the operator location information and the operator eye information, wherein the operator location information comprises a distance and a direction of the operator relative to the display panel, wherein the operator eye information comprises a focus direction and a focus angle of the operator;
   wherein the display panel displays the on screen display on the display screen according to the display position and the display size.

2. The display device of claim 1, wherein when the processor determines the image comprises an identifiable operator, the processor performs the face recognition operation and the eye recognition operation.

3. The display device of claim 2, wherein when the processor determines the image does not comprise the identifiable operator, the processor determines the display position according to an operation tool of the operator;
   wherein when the operation tool is a remote controller, the display position is center of the display screen, wherein when the operation tool is a press-button located on the display panel, the display position is a position on the display screen adjacent to the press-button.

4. The display device of claim 1, wherein the processor determines a number of people comprised in the image, when the number of people is 1, the face recognition operation and the eye recognition operation are performed.

5. The display device of claim 4, wherein when the number of people is larger than 1, the processor performs a human posture and distance detection operation to the image, so as to determine the operator.

6. The display device of claim 1, wherein the processor determines the display size according to the distance.

7. The display device of claim 1, wherein the operator eye information further comprises a focus point, the processor calculates a variation of the focus point, and the processor adjusts the display position and the display size when the variation is larger than a variation threshold.

8. The display device of claim 1, wherein when performing the face recognition operation, the processor obtains a plurality of facial features, and the processor obtains the operator location information according to the plurality of facial features.

9. The display device of claim 1, wherein when performing the eye recognition operation, the processor obtains a plurality of eye features, and the processor obtains the operator eye information according to the plurality of eye features.

10. A display method, comprising:
capturing an image by an image capture element;
analyzing the image to obtain an operator location information of an operator in the image and performing a face recognition operation corresponding to the operator by a processor;
performing an eye recognition operation corresponding to the operator to obtain an operator eye information of the operator by the processor;
determining a display position and a display size of an on screen display on a display screen according to the operator location information and the operator eye information by the processor, wherein the operator location information comprises a distance and a direction of the operator relative to a display panel, wherein the operator eye information comprises a focus direction and a focus angle of the operator; and
displaying the on screen display according to the display position and the display size on the display screen by the display panel.

11. The display method of claim 10, further comprising:
determining whether the image comprises an identifiable operator; and
performing the face recognition operation and the eye recognition operation when the identifiable operator is comprised.

12. The display method of claim 11, further comprising:
determining the display position according to an operation tool of the operator by the processor when the image does not comprise the identifiable operator;
setting the display position to be center of the display screen when the operation tool is a remote controller; and
setting the display position to be a position on the display screen adjacent to a press-button when the operation tool is the press-button located on the display panel.

13. The display method of claim 10, further comprising:
determining a number of people comprised in the image; and
performing the face recognition operation and the eye recognition operation when the number of people is 1.

14. The display method of claim 13, further comprising:
performing a human posture and distance detection operation to the image to determine the operator when the number of people is larger than 1 by the processor.

15. The display method of claim 10, further comprising:
determining the display size according to the distance.

16. The display method of claim 10, wherein the operator eye information further comprises a focus point, and the display method further comprises:
calculating a variation of the focus point; and
adjusting the display position and the display size when the variation is larger than a variation threshold.

17. The display method of claim 10, further comprising:
obtaining a plurality of facial features when performing the face recognition operation; and
obtaining the operator location information according to the plurality of facial features.

18. The display method of claim 10, further comprising:
obtaining a plurality of eye features when performing the eye recognition operation; and
obtaining the operator eye information according to the plurality of eye features.

* * * * *